(12) United States Patent
Shao et al.

(10) Patent No.: US 12,030,191 B2
(45) Date of Patent: Jul. 9, 2024

(54) VISION-GUIDED PICKING AND PLACING METHOD, MOBILE ROBOT AND COMPUTER-READABLE STORAGE MEDIUM

(71) Applicant: UBKang (Qingdao) Technology Co., Ltd., Qingdao (CN)

(72) Inventors: Dan Shao, San Gabriel, CA (US); Yang Shen, Los Angeles, CA (US); Fei Long, Pasadena, CA (US); Jiexin Cai, Pasadena, CA (US); Huan Tan, Pasadena, CA (US)

(73) Assignee: UBKANG (QINGDAO) TECHNOLOGY CO., LTD., Qingdao (CN)

( * ) Notice: Subject to any disclaimer, the term of this patent is extended or adjusted under 35 U.S.C. 154(b) by 282 days.

(21) Appl. No.: 17/512,685

(22) Filed: Oct. 28, 2021

(65) Prior Publication Data

US 2023/0137715 A1     May 4, 2023

(51) Int. Cl.
*B25J 9/16*     (2006.01)

(52) U.S. Cl.
CPC ............ *B25J 9/1669* (2013.01); *B25J 9/162* (2013.01); *B25J 9/1666* (2013.01); *B25J 9/1697* (2013.01)

(58) Field of Classification Search
CPC ........ B25J 9/1669; B25J 9/162; B25J 9/1666; B25J 9/1697; B25J 13/08; B25J 19/023; G05B 2219/4061; G05B 2219/39393; G05B 2219/31305; G06T 1/0014; G06T 7/55; G06V 10/245
See application file for complete search history.

(56) References Cited

U.S. PATENT DOCUMENTS

| | | | | |
|---|---|---|---|---|
| 8,908,913 B2 * | 12/2014 | Taguchi | .................... | G06T 7/75 382/103 |
| 2014/0067317 A1 * | 3/2014 | Kobayashi | ............... | G05D 3/00 702/153 |
| 2016/0167228 A1 * | 6/2016 | Wellman | ................ | B25J 9/1602 901/3 |
| 2017/0036354 A1 * | 2/2017 | Chavan Dafle | ...... | B25J 15/0253 |
| 2018/0268184 A1 * | 9/2018 | Wagner | .............. | G06V 40/1312 |
| 2019/0099891 A1 * | 4/2019 | Tomioka | ................ | B25J 9/1697 |
| 2020/0130963 A1 * | 4/2020 | Diankov | .............. | G06V 10/255 |
| 2020/0331709 A1 * | 10/2020 | Huang | ..................... | B25J 9/163 |

\* cited by examiner

*Primary Examiner* — Khoi H Tran
*Assistant Examiner* — Dairon Estevez

(57) ABSTRACT

A vision-guided picking and placing method for a mobile robot that has a manipulator having a hand and a camera, includes: receiving a command instruction that instructs the mobile robot to grasp a target item among at least one object; controlling the mobile robot to move to a determined location, controlling the manipulator to reach for the at least one object, and capturing one or more images of the at least one object using the camera; extracting visual feature data from the one or more images, matching the extracted visual feature data to preset feature data of the target item to identify the target item, and determining a grasping position and a grasping vector of the target item; and controlling the manipulator and the hand to grasp the target item according to the grasping position and the grasping vector, and placing the target item to a target position.

12 Claims, 12 Drawing Sheets

VISION-GUIDED PICKING AND PLACING METHOD, MOBILE ROBOT AND COMPUTER-READABLE STORAGE MEDIUM

TECHNICAL FIELD

The present disclosure generally relates to robots, and particularly to a vision-guided picking and placing method, a mobile robot, and a computer-readable storage medium.

BACKGROUND

Grasp planning is a fundamental problem in the field of robotics that has been attracting an increasing number of researchers. Many robots perform "blind grasping" (e.g., within a warehouse or production line) where they're dedicated to picking up an object from the same location every time. If anything changes, such as the shape, texture, or location of the object, the robot won't know how to respond, and the grasp attempt will most likely to fail. This approach is apparently not suitable for other applications where the robots are required to grasp a target at a random position among other objects.

Therefore, there is a need to provide a method and a mobile robot to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
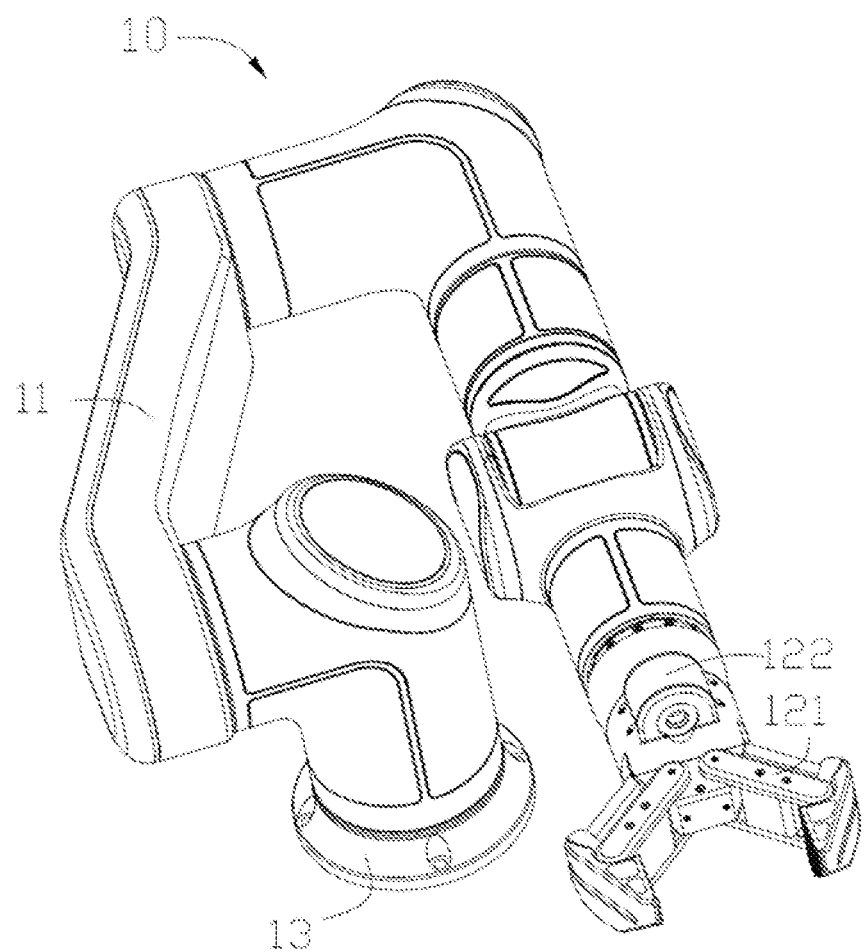
FIG. 1 is an isometric schematic view of a robotic manipulator according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the Rill extent indicated by the broad general meaning of the terms in which the appended claims are expressed.

Figure 2:
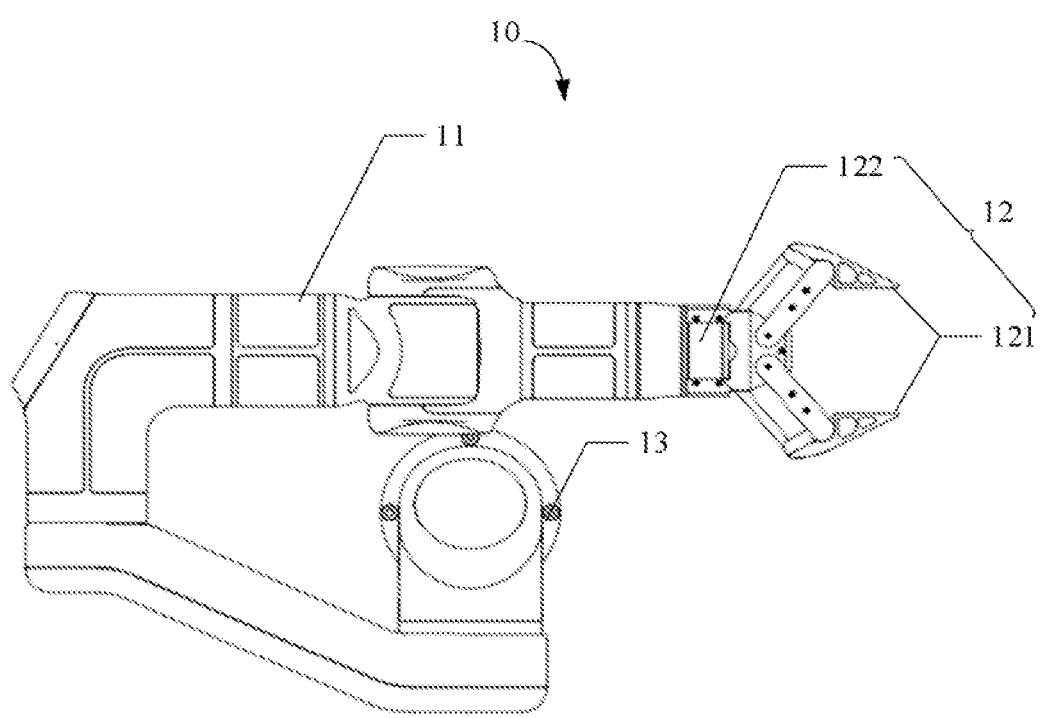
FIG. 2 is a top view of the robotic manipulator of FIG. 1.
Figure 3:
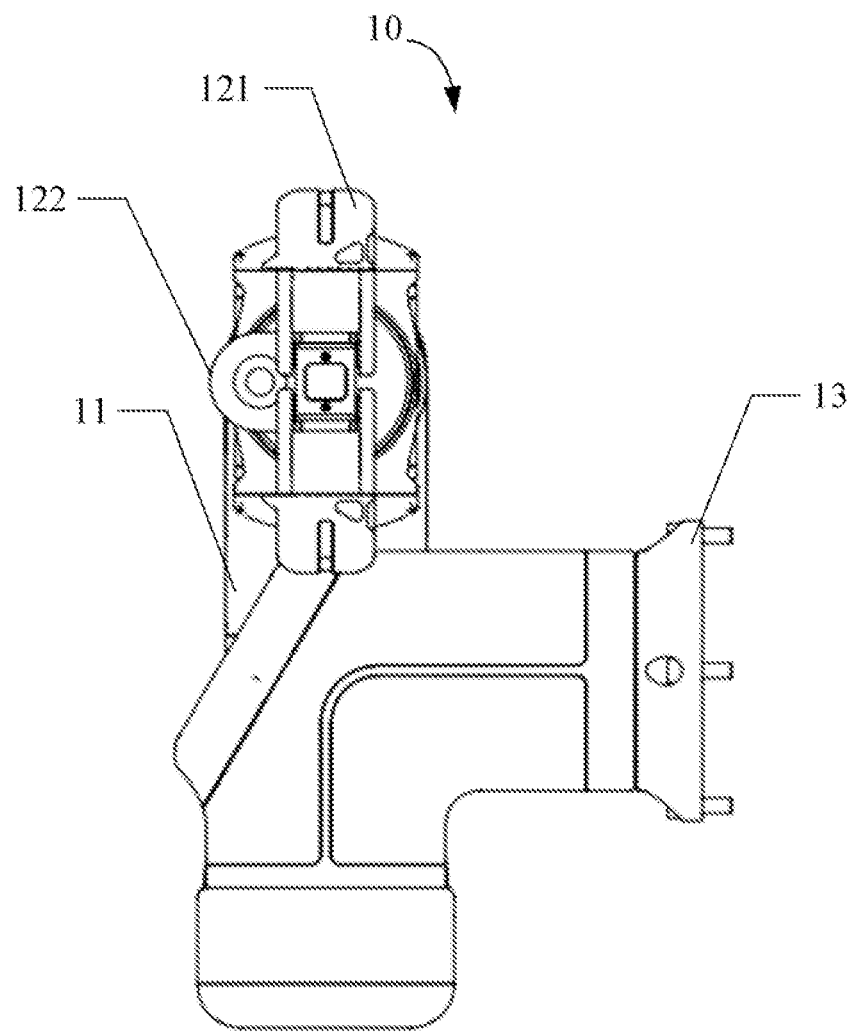
FIG. 3 is a side view of the robotic manipulator of FIG. 1.

FIGS. 1-3 show a robotic manipulator 10 according to one embodiment. The manipulator 10 may he a foldable, 6-DOF manipulator. The manipulator 10 may include a link body 11 that includes multiple links connected to one another, an end of arm tooling (EOAT) 12, and a mounting interface 13. The EOAT 12 may include a hand 121 and a camera 122 that is arranged on or adjacent to the hand 121. In one embodiment, the hand 121 may be a gripper having two lingers. However, the configuration of the hand 121 may change according to actual needs. For example, the hand 121 may be configured to resemble a human hand. The manipulator 10 is connectable to the body of a mobile robot through the mounting interface 13. In one embodiment, an embedded central processing unit (CPU) board of the mobile robot may execute an integrated vision-manipulation algorithm to control the manipulator 10 to perform a pick-and-place operation.

Figure 4:
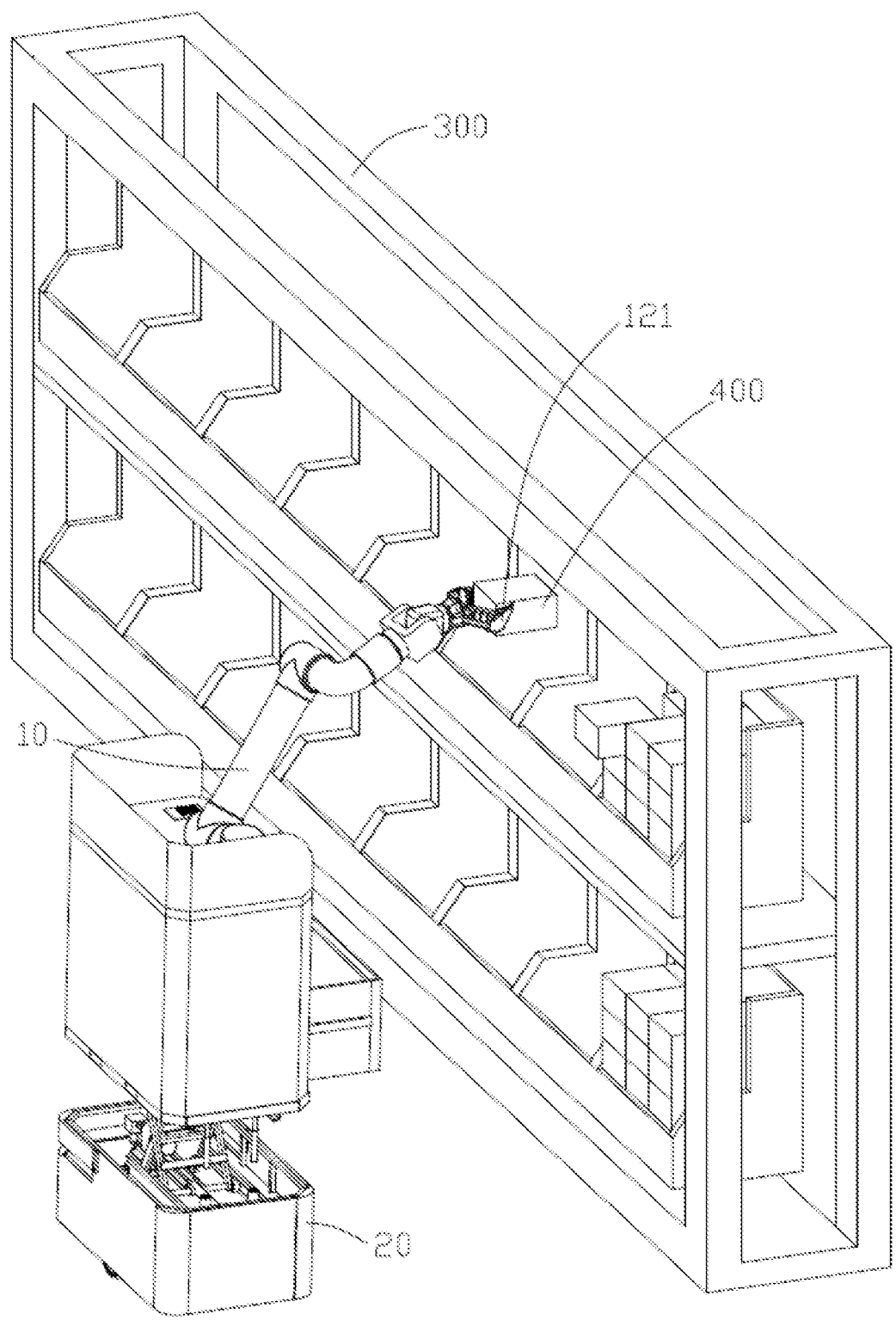
FIG. 4 is a schematic diagram showing an exemplary application scenario of a mobile robot using the manipulator.

The mobile robot can be an autonomous robot and is versatile enough to perform precision grasps on small objects, as well as robust power grasps on heavier/bulkier objects. The robot is able to identify objects in a scene, train or detect an optimal grasp pose for each object geometry, localize objects relative to a manipulator base or the EOAT 12, plan collision-free or "collision-safe" path to pre-grasp pose, plan grasping configuration, and localize objects in post-grasp configuration. With these capabilities, the mobile robot can provide an unsupervised end-to-end logistics solution to cater to various delivery and logistics needs. For example, as shown in FIG. 4, after the mobile robot has moved to a target location (e.g., shelf 300), the manipulator 10 and the EOAT 12 are controlled to be in a state such that the EOAT 12 can reach a determined position to pick up a determined object 400. In one embodiment, after the EOAT 12 has grasped the object 400, the mobile robot will control the manipulator 10 and the EOAT 12 to place the object 400 to a determined position, such as storage unit (e.g., a drawer) of the mobile robot. After the mobile robot has moved from the shelf 300 to a determined location, the mobile robot will open the drawer 21 to allow the manipulator 10 to unload the object 400.

Figure 5:
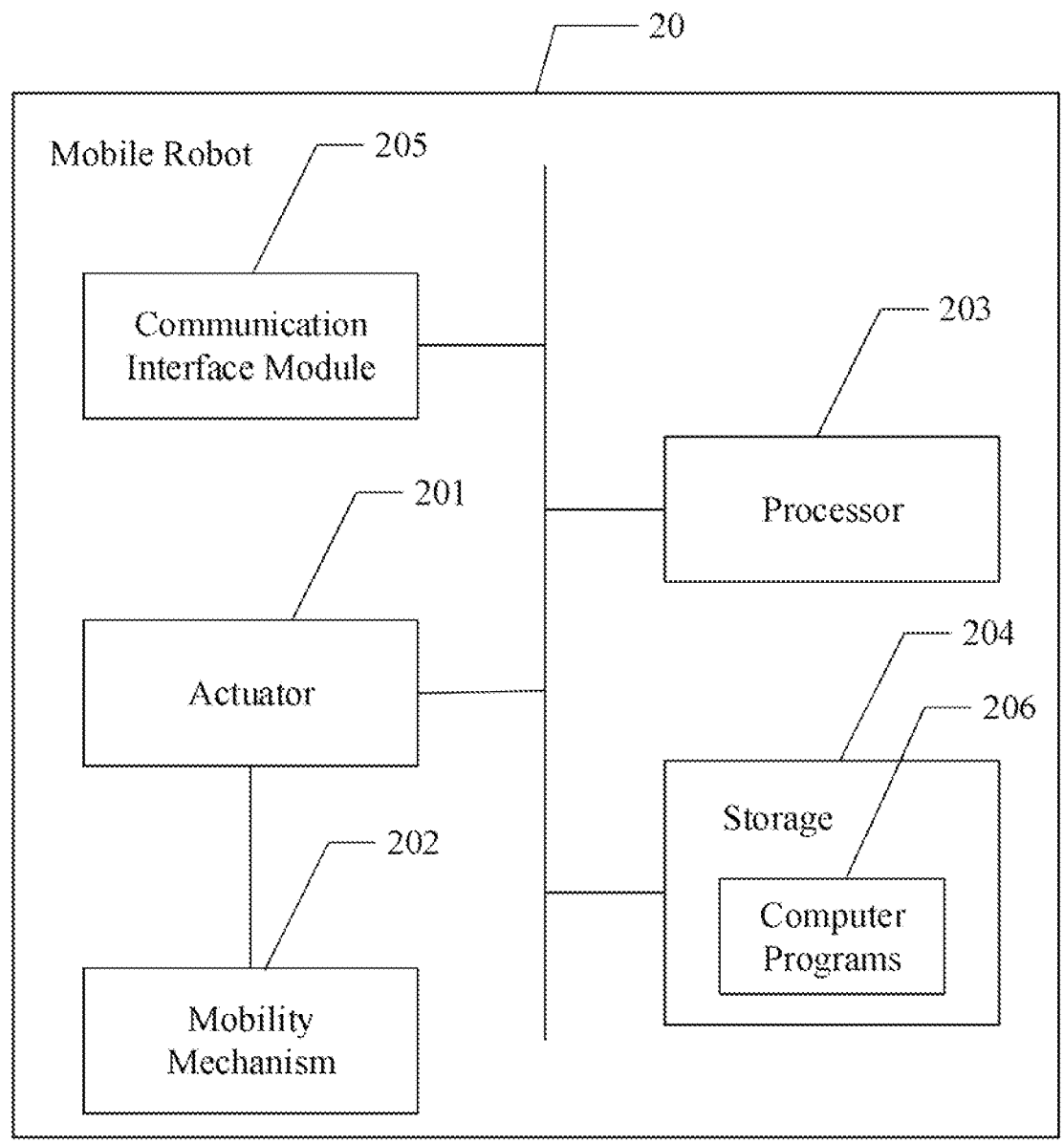
FIG. 5 is a schematic block diagram of the mobile robot according to one embodiment.

FIG. 5 shows a schematic block diagram of a mobile robot 20 according to one embodiment. The mobile robot 20 may be a wheeled robot and can operate in various application environments, such as hospitals, factories, warehouse, malls, streets, airports, home, elder care centers, museums, restaurants, hotels, and even wild fields, etc. However, the example of FIG. 5 is merely an illustrative example. The mobile robot 20 may be other types of robots. The mobile robot 20 may include an actuator 201, a mobility mechanism 202, a processor 203, a storage 204, and a communication interface module 205. The camera 122 is electrically connected to the processor 203 for transmitting the captured images to the processor 203. The mobility mechanism 202 may include one or more wheels and/or tracks. The actuator 201 is electrically coupled to the mobility mechanism 202 and the processor 203, and can actuate movement of the mobility mechanism 202 according to commands from the processor 203. The actuator 201 can be an electric motor or a servo. The storage 204 may include a non-transitory computer-readable storage medium. One or more executable computer programs 206 are stored in the storage 204. The processor 203 is electrically connected to the storage 204, and perform corresponding operations by executing the executable computer programs stored in the storage 204. The communication interface module 205 may include a wireless transmitter, a wireless receiver, and computer programs executable by the processor 203. The communication interface module 205 is electrically connected to the processor 203 and is configured for communication between the processor 203 and external devices In one embodiment, the camera 122, the actuator 201, the mobility mechanism 202, the processor 203, the storage 204, and the communication interface module 205 may be connected to one another by a bus.

The processor 203 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. When the processor 203 executes the computer programs 206, the steps in the embodiments of the method for controlling the mobile robot 20, such as steps S81 through S85 in FIG. 8, steps S91 through S98 in FIG. 9, and steps S941 through S944 in FIG. 10, are implemented.

The storage 204 may be an internal storage unit of the mobile robot 20, such as a hard disk or a memory. The storage 204 may also be an external storage device of the mobile robot 20, such as a plug-in hard disk, a smart memory card (SMC), and a secure digital (SD) card, or any suitable flash cards. Furthermore, the storage 204 may also include both an internal storage unit and an external storage device. The storage 204 is used to store computer programs, other programs, and data required by the mobile robot 20. The storage 204 can also be used to temporarily store data that have been output or is about to be output.

Exemplarily, the one or more computer programs 206 ma be divided into one or more modules/units, and the one or more modules/units are stored in the storage 204 and executable by the processor 203. The one or more modules/units may be a series of computer program instruction segments capable of performing specific functions, and the instruction segments are used to describe the execution process of the one or more computer programs 206 in the mobile robot 20.

Figure 6:
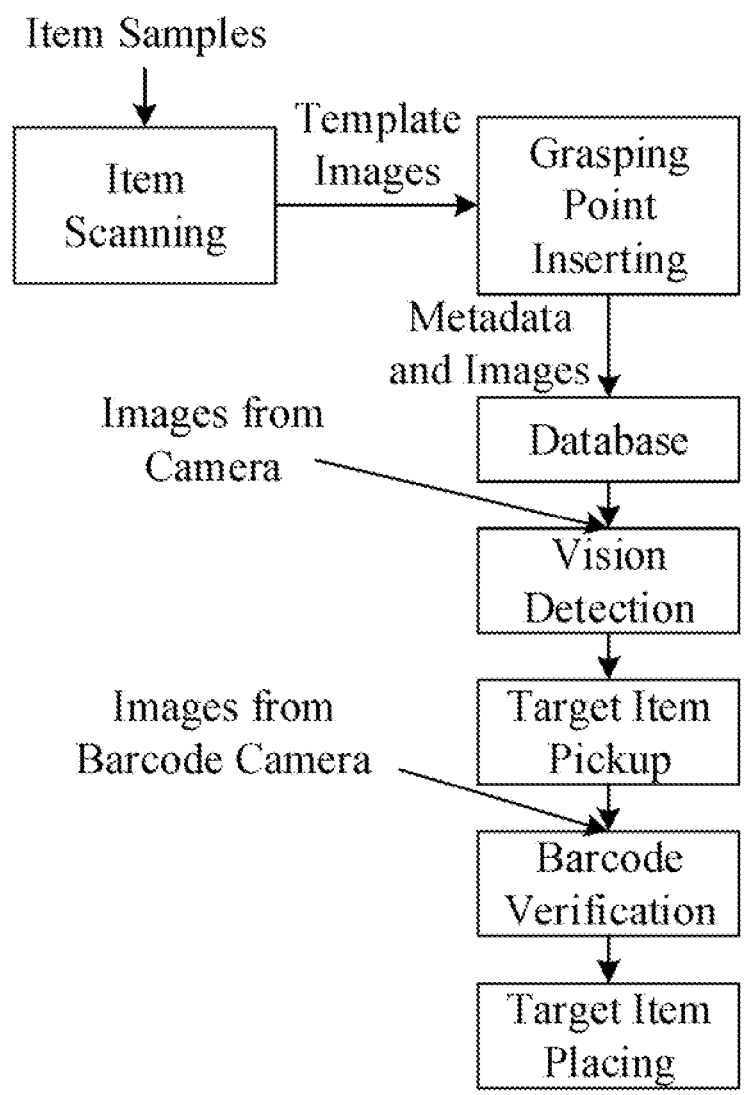
FIG. 6 is an exemplary flowchart of a method for controlling the mobile robot to pick and place objects according to one embodiment.

FIG. 6 is an exemplary flowchart of a method for controlling the mobile robot to pick and place objects by visually guiding the manipulator 10. Specifically, First, a database is built in advance. Specifically, item samples to be picked and placed by the mobile robot are determined and then scanned to obtain template images captured at multiple different perspectives around each item sample. Each item sample corresponds to multiple template images. Grasping points are inserted in each template image. Here, grasping points are positions on each item sample that can be in contact with fingers of the hand 121 such that the item sample can be grasped by the hand 121. Grasping data including the positions associated with the grasping points is determined as metadata The metadata and corresponding template images are stored to obtain the database. The database can be configured in a cloud server, or it can be configured in the mobile robot 20. The mobile robot 20 then captures images using the camera 122. The captured images and the data in the database (including the metadata and template images of the item samples corresponding to the captured images) are input into a vision detection module for recognition According to the recognition result, the mobile robot 20 controls the hand 121 to grasp a recognized target item. After the hand 121 grasped the recognized target item, the hand 121 will rotate this item in the air by 360 degrees. One ordinary camera (not the one for detecting targets, for example, a universal serial bus (USB) camera) is mounted on the side, observing the recognized target item during rotation. If there is a barcode attached on a surface of the recognized target item, this USB camera continuously captures images of this recognized target item and runs a barcode finding and decoding algorithm, to produce a barcode string This result will be compared with the database of this target, to verify if it is the correct item. After the barcode verification is passed, the mobile robot is controlled to place the target item to a target position, which is a pre-designated position corresponding to the pick-and-place task executed by the mobile robot. It should be noted that not every target item has a barcode on it. Only some ambiguous ones or the ones easy to mistake have barcodes on them. The barcode stored in the database is entered during the item sunning step, together with template capturing and grasp data insertion.

Figure 7:
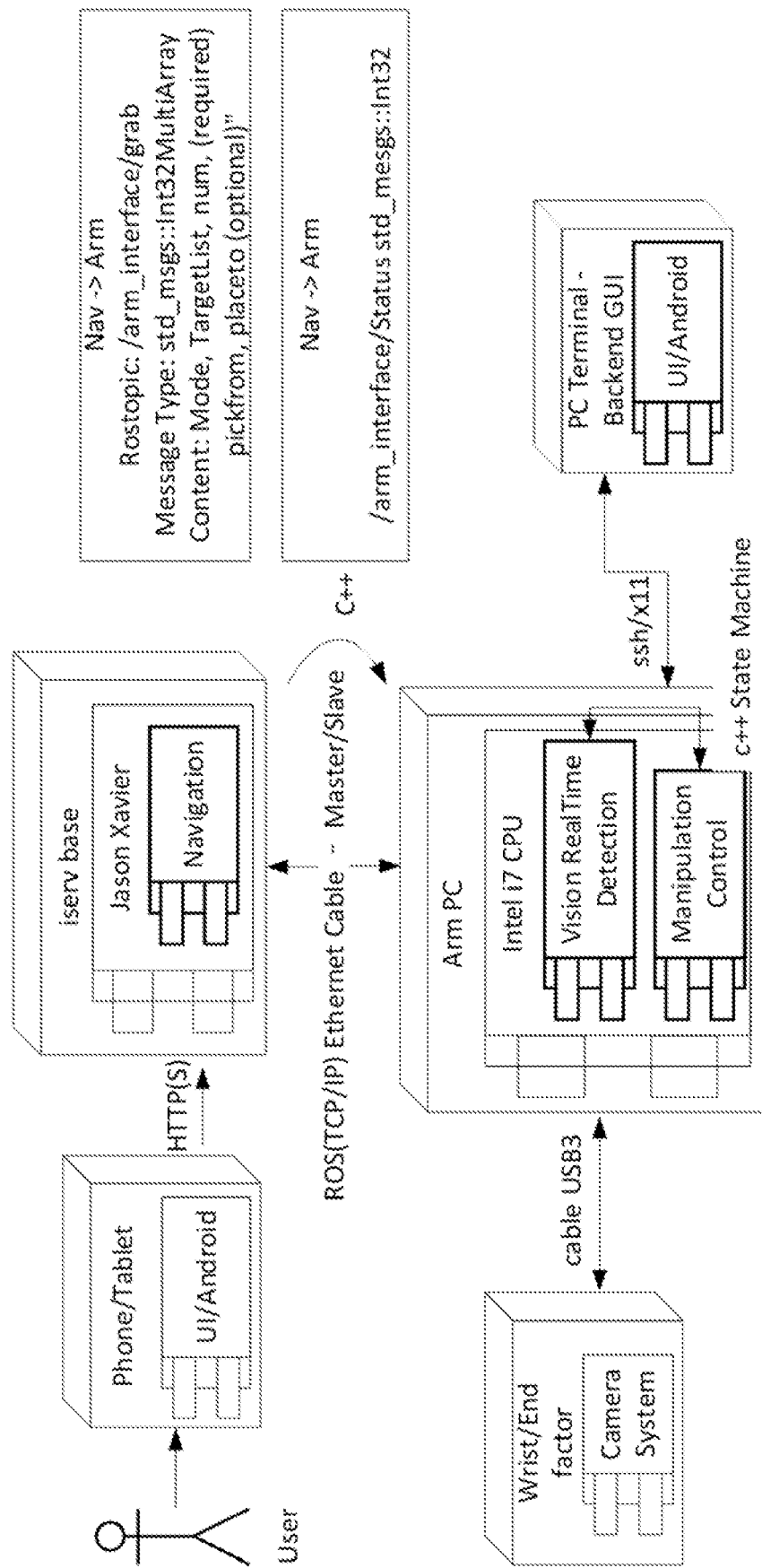
FIG. 7 is a schematic diagram of a system for controlling the mobile robot according to one embodiment.

FIG. 7 is a schematic diagram of a system for controlling the mobile robot. Specifically, a user may use a mobile phone/tablet computer to interact with a server so as to control the operation of the mobile robot. The mobile phone/tablet computer and the server may exchange data through the hap transmission protocol. The server may be connected to an arm end computer through the router Ethernet network with master-slave relationship The arm end computer may be a C++ state machine, which can include a visual real-time detection module and an operation control module. The arm end computer may be connected to the camera of the mobile robot via a USB connector and obtains the images captured by the camera After the visual real-time detection module processes the images, the target object to be grasped can be determined. The operation control module then controls the hand of the mobile robot to grasp the target object. The arm-end computer can also communicate with a personal computer (PC) with a graphical user interface so as to achieve the function of using a remote GUI program on the PC.

Figure 8:
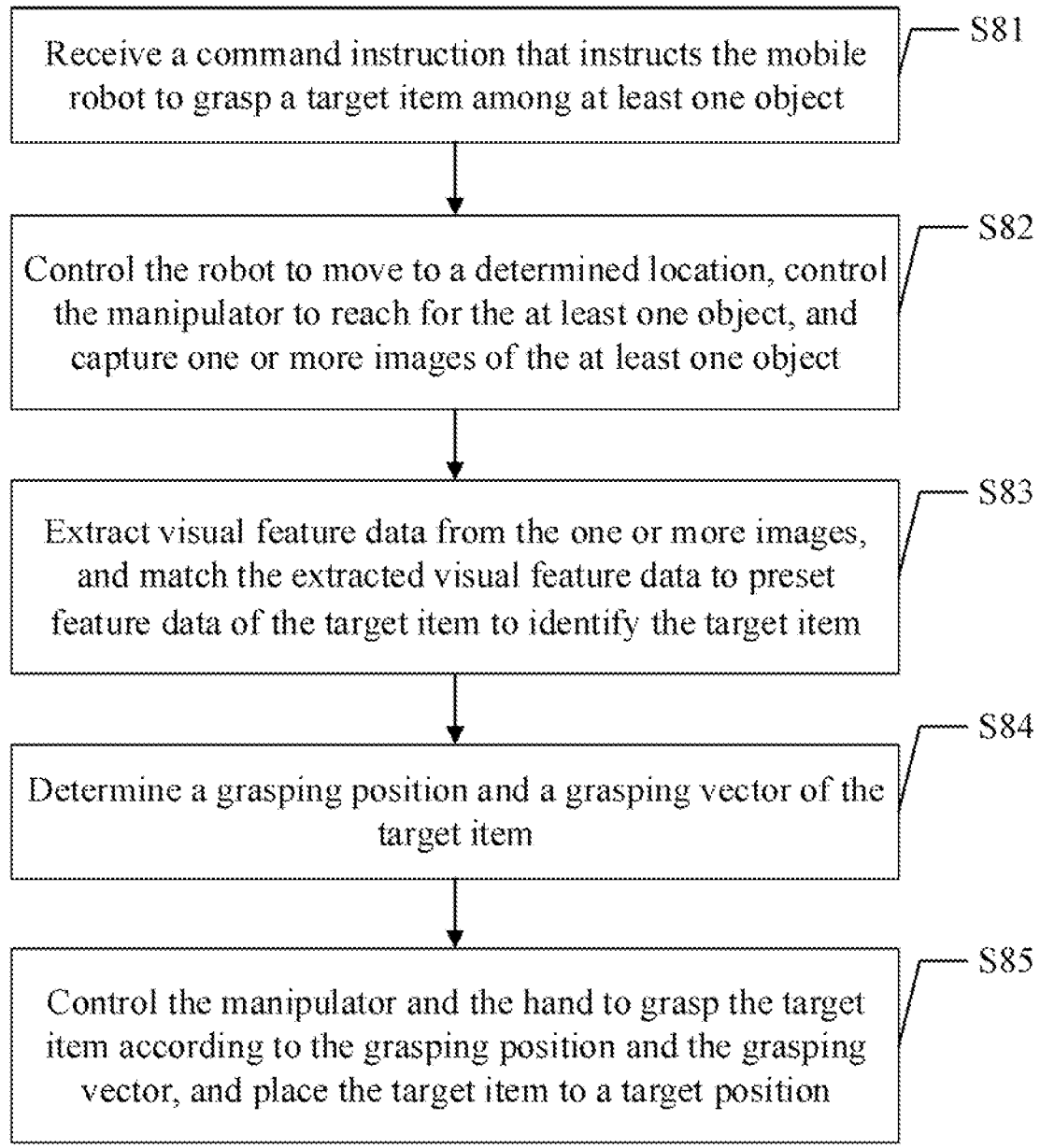
FIG. 8 is an exemplary flowchart of a method for visually guided picking and placing objects according to one embodiment.

FIG. 8 shows an exemplary flowchart of a method for visually guided picking and placing objects according to one embodiment. This method can be implemented to control the mobile robot 20 shown in FIGS. 4 and 5 equipped with a manipulator having a hand and a camera to perform a pick-and-place operation. Specifically, the method can be implemented by the mobile robot 20 shown in FIG. 5 or other control devices electrically coupled with the mobile robot 20. Other control devices can be but not limited to: desktop computers, tablet computers, laptop computers, multimedia players, servers, man mobile devices (such as smart phones, handheld phones, etc.) and smart wearable devices (such as smart watches, smart glasses, smart cameras, smart bracelets, etc) and other computer devices with computing, and control functions. In one embodiment, the method may include steps S81 through S85.

Step S81: Receiving a command instruction that instructs the mobile robot to grasp a target item among at least one object.

The mobile robot 20 may receive the command instruction from a user. The user may send the command instruction using a device e.g., a mobile phone) wirelessly connected to the mobile robot 20. The command instruction may include the location (e.g., the shelf of FIG. 4) where the at least one object is located, so that the mobile robot 20 can move autonomously to the location. The number of the at least one object is not limited, and multiple objects are taken as an example in the embodiment herein. The target item is one of the multiple objects.

Step S82: Controlling the mobile robot to move to a determined location associated with the at least one object, controlling the manipulator to reach for the at least one object, and capturing one or more images of the at least one object using the camera in real time.

After the mobile robot has moved to the determined location e.g., the shelf of FIG. 4), the manipulator 10 of the mobile robot 20 is controlled to reach for the multiple objects. When the manipulator 10 reaches for the at least one object, the camera 122 is controlled to capture images of the objects in real time.

Step S83: Extracting visual feature data from the one or more images, and matching the extracted visual feature data to preset feature data of the target item to identify the target item.

The robot performs vision-related processing on the images captured by the camera 122. The robot requires at least distance information and brightness and darkness information to determine the position and shape of an object. The visual features in each image can include: color features, texture features, shape features, spatial relationship features, etc. Extraction positions of the visual features can include edges, corners, regions, and ridges.

The feature data of the target item may include the pre-stored images of the target item in the previously built database. A feature extraction algorithm can be executed to extract multiple visual feature data from the images of the target item. The extracted visual feature data will be compared with the visual feature data of the multiple objects. Alternatively, the visual feature data of the target item may include not only the pre-stored images of the target item in the database, but also the visual feature data obtained after the images of the target item is pre-processed such that the visual feature data of the target item may be compared with the visual feature data of the multiple objects.

The extracted visual feature data of the images of the multiple objects is compared with the feature data of the target item in the database to recognize the target item among the multiple objects. The object with the highest matching degree is determined as the target item.

Step S84: Determining a grasping position and a grasping vector of the target item.

The grasping positions are related to the type of the hand 121 of the mobile robot 20. The selection of the grasping positions should consider the convenience and firmness of the hand grasping an object The grasping positions are usually higher than the center of gravity of an object. The grasping vector is a grasping pose (i.e., a grasping orientation). In one embodiment, the grasping vector is the yaw angle of the target item.

In one embodiment, the grasping positions and grasping vector of the target item can be stored in the database as part of the feature data of the target item. The grasping vector of the target item can be calculated according to the current positional relationship between the hand 121 and the target item to obtain the grasping angle at which the target item can be grasped and picked up.

Step S85: Controlling the manipulator and the hand to grasp the target item according to the grasping position and the grasping vector, and placing the target item to a target position.

The target position may be a position specified by the command instruction. After moving autonomously to a determined location (e.g., the shelf of FIG. 4) associated with the target item, the mobile robot controls the manipulator and the hand to place the target item to the target position (e.g., a position on the shelf).

Figure 9:
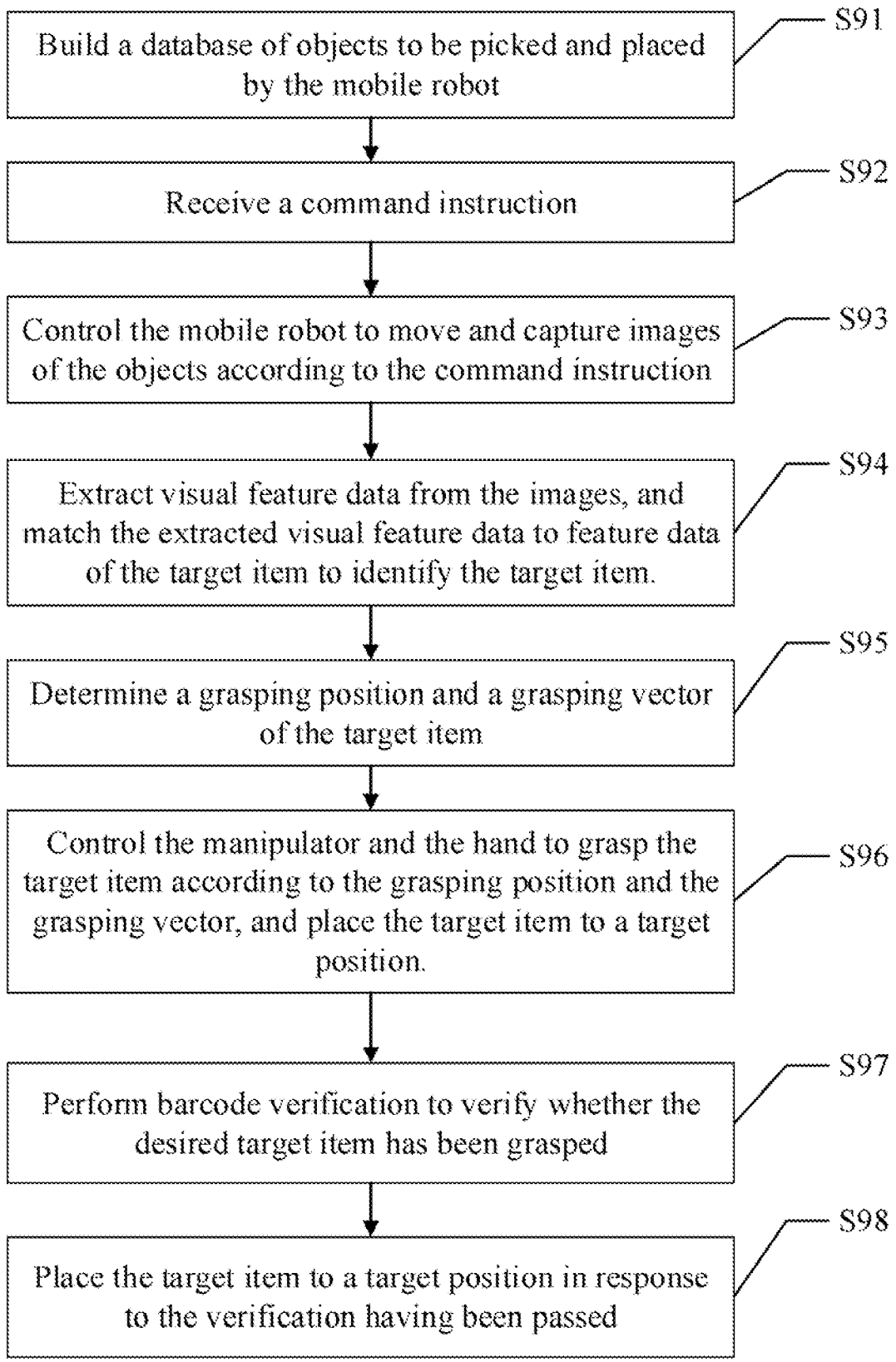
FIG. 9 is an exemplary flowchart of a method for visually guided picking and placing objects according to another embodiment.
Figure 10:
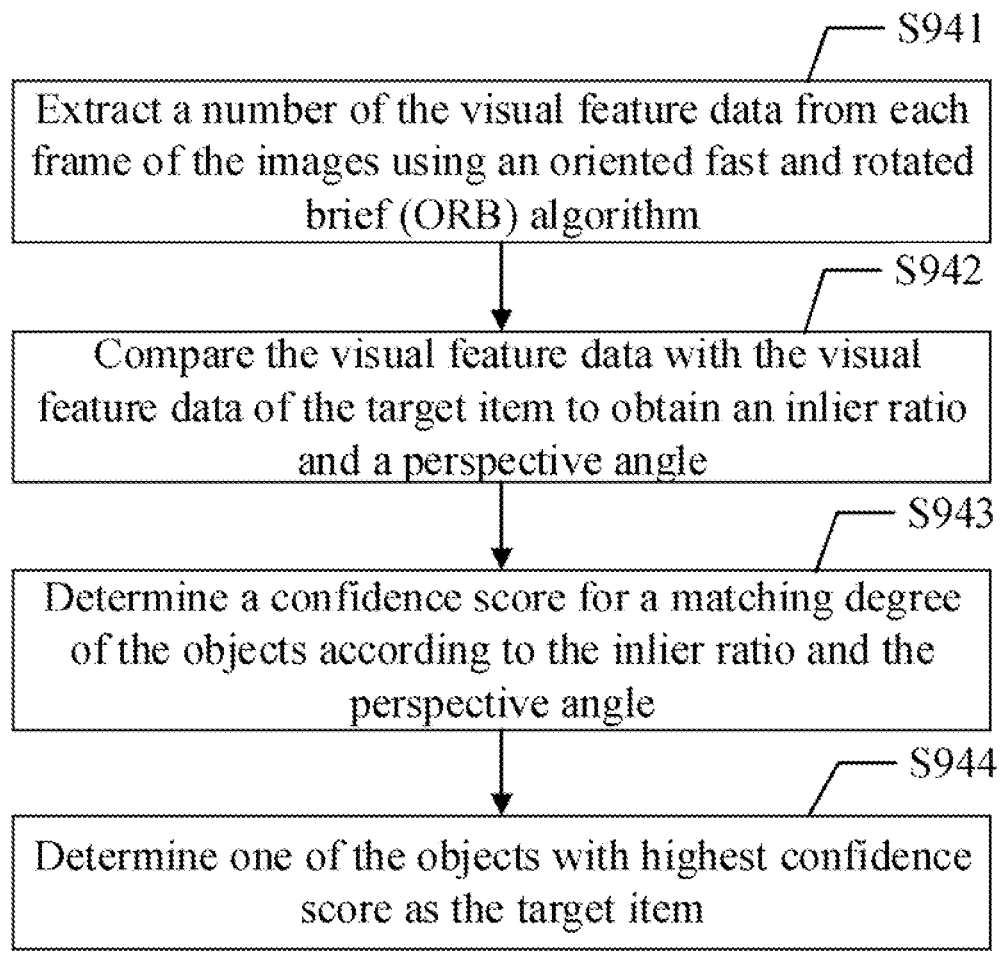
FIG. 10 is an exemplary flowchart of a method for determining one of the objects with highest confidence score according to one embodiment.

FIG. 9 shows a flowchart of a method for visually guided picking and placing objects according to one embodiment. The method may include steps S91 through S96.

Step S91: Building a database of objects to be picked and placed by the mobile robot.

The database may be built on a server. Item samples associated with the pick-and-place tasks performed by the mobile robot are scanned using a scanning device. Template images of the item samples are thus obtained. The item samples are the items that the mobile robot may grasp when performing pick-and-place tasks, The template images are the images obtained by scanning the item samples from different perspectives by the scanning device. Each item sample corresponds to multiple template images captured at different perspectives such that the target item can be recognized by comparison of one or more images of the target item captured at different perspectives with the corresponding template images.

The grasping points of the multiple template images of each item sample are then determined using a preset algorithm The grasping data of these grasping points is inserted in each template image. For example, the grasping data of at least one pair of grasping points is inserted into the at least one template image. The grasping data may include the positions that are in contact with the hand 121 grasping the corresponding item sample and a grasping vector. The manipulator of the mobile robot can firmly grasp an object according to the grasping data corresponding to the object. The grasping data is used as metadata. Multiple template images of each item sample and metadata corresponding to each template image are stored as feature data of a corresponding item sample, so as to build the database. The item samples include the target item to be grasped.

To complete the end-to-end object recognition and detection task, an item scanning system is included as an add-on system, with automated method collecting desired training data on the target items. This item scanning system is used for scanning the items in the deployment facility so the pick-and-place system is tailored to specific application requirements, given that different logistic applications require different target items to be handled.

Step S92: Receiving a command instruction.

The command instruction is to instruct the mobile robot 20 to grasp a target item among the multiple objects. The mobile robot 20 may receive the command instruction from a user. The user may send the command instruction using a device (e.g., a mobile phone) wirelessly connected to the mobile robot 20. The command instruction may include the location (e.g., the shelf of FIG. 4) where the multiple objects are located, so that the mobile robot 20 can move autonomously to the location.

Step S93: Controlling the mobile robot to move and capture images of the objects according to the command instruction.

After receiving the command instruction, the mobile robot moves autonomously to a determined location associated with the target item. The mobile robot then controls the manipulator to reach for the objects, and captures images of the objects in real time using the camera.

In one embodiment, after the mobile robot recognizes the target item, it calculates collision-free motion trajectories of the manipulator according to a position and an orientation of the target item. The mobile robot controls movement of the manipulator according to the calculated result. Specifically, a motion planner is executed to check if inverse kinematics (IK) solutions could be calculated, and to check if any pre-defined self-collision could be avoided within the trajectory solutions calculated based on IK solutions if more than one solution is available, one of the calculated motion trajectories will be randomly selected as a final motion trajectory. If only one solution is available, the calculated motion trajectory will be selected as the final motion trajectory. The manipulator will be controlled to grasp the target item according to the final trajectory.

If more than one solution is available, the final trajectory will be executed by low-level manipulator motion control. The manipulator will move to the object detection and recognition site, open the EOAT, wait for detailed position/orientation command calculated by vision module and approach the object with EOAT half-open and do the grasp.

It should be noted that when more than one solution is available, the final trajectory would be picked based on the constraints stochastically. The constraints may include a minimum end effector travel distance, a minimum joint space travel distance, a minimum joint torque change, and the like.

The low-level manipulator motion control refers to position control and speed control, while high-level motion control can include task scheduling and interaction with other modules such as computer vision and voice commands.

In one embodiment, the mobile robot may include an active lighting control module that is installed on the body of the robot. The active lighting control module is to ensure no degradation of vision detection performance in case of dark, uneven illumination and other non-optimal lighting environment.

Step S94: Extracting visual feature data from the images, and matching the extracted visual feature data to feature data of the target item to identify the target item.

For each frame of the image of the objects captured by the camera, the data of multiple visual features can be extracted using an oriented fast and rotated brief (ORB) algorithm. In one embodiment, data of up to 200 visual features can be extracted. The multiple visual feature data is then matched to the visual feature data of the target item using a balanced binary search method and a nearest Euclidean distance algorithm to identify the target item.

In one embodiment, the visual feature data of the target item can be extracted from the template images of the target item stored in the aforementioned database by using the ORB algorithm. Among all the objects, the object that has visual features with a minimum Euclidean distance to the visual features of the target item in the database is the matched target item to he grasped. The position information and posture estimation (i.e., orientation) of the target item is then calculated. In order to speed up the matching calculation, a balanced binary search method "KD tree" is used to speed up the search process. For multi-core CPU platforms, feature extraction and feature matching are optimized through multi-threaded parallelization. Depending on the clutter of the background, 50-100 milliseconds of calculation time is required for each frame of image.

Referring to FIG. 10, in one embodiment, step S94 may include the following steps.

Step S941: Extracting a number of the visual feature data from each frame of the images using an oriented fast and rotated brief (ORB) algorithm.

Step S942 Comparing the visual feature data with the visual feature data of the target item to obtain an inlier ratio and a perspective angle. The visual feature data of the target item is extracted from a template image of the target item by using the ORB algorithm Step S943: Determining a confidence score for a matching degree of the objects according to the inlier ratio and the perspective angle.

Step S944: Determining one of the objects with highest confidence score as the target item.

False positives can be filtered out by scoring the confidence of the matching degree. The detected objects are sorted, and the object with the highest confidence score is determined as the target item. Generally, two approaches can be used to score confidence.

Specifically, the first approach is to determine the confidence score according to inlier ratios. That is, the feature points of each object in the captured images are compared with the feature points of the target item stored in the database. The higher the interior ratio is, the higher the confidence score is.

The second approach is to determine the confidence score according to perspective angles. That is, the degrees of distortion of the objects in the captured images with respect to the target item stored in the database are compared with one another. The smaller the perspective angle is, the higher the confidence score is.

Figure 11:
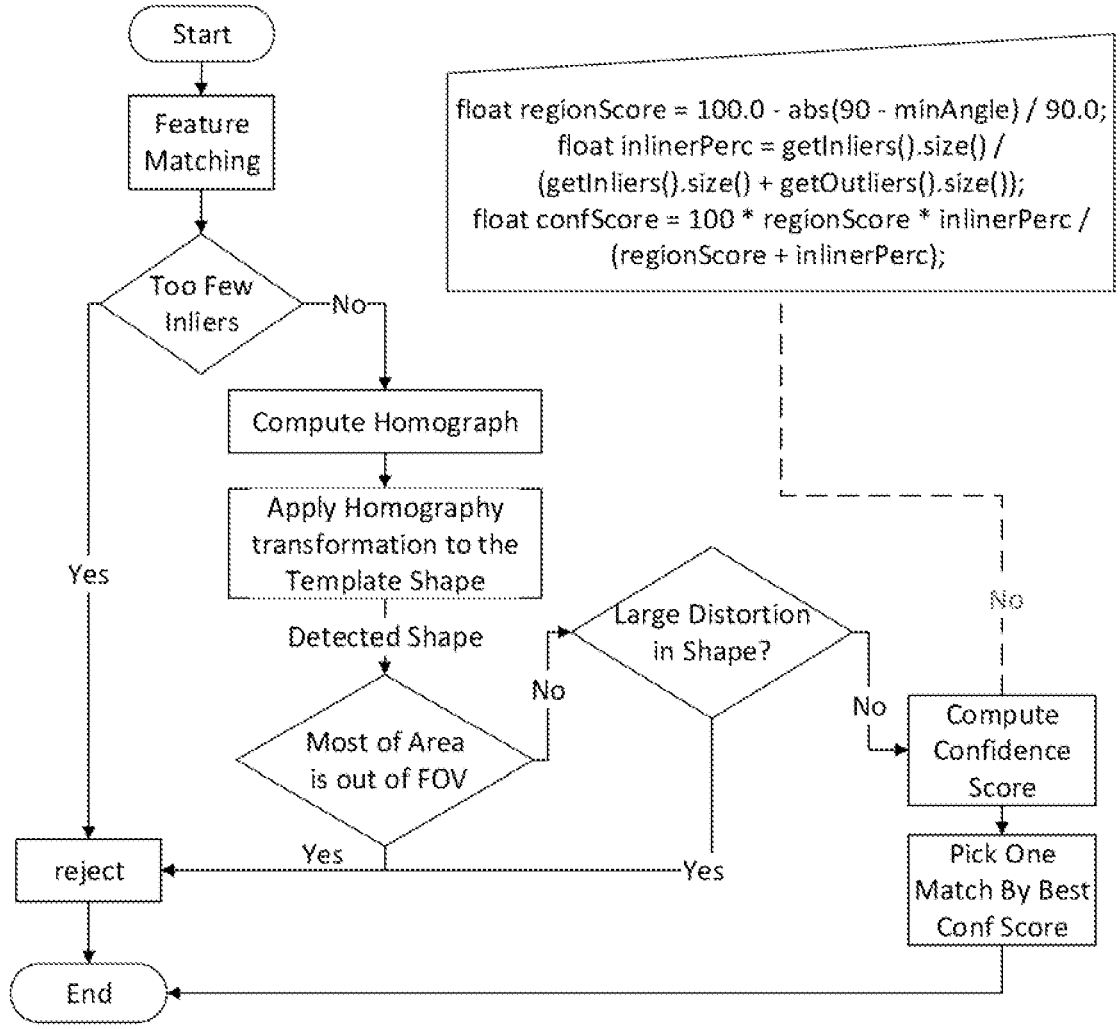
FIG. 11 is an exemplary flowchart of a method for determining one of the objects with highest confidence score according to one embodiment.

FIG. 11 shows an exemplary flowchart of a method for determining one of the objects with highest confidence score as the target item.

Specifically, the processor 203 determines whether the inlier ratio is less than a first preset value. When the inner ratio is not less than the first preset value, the processor 203 calculates a homography matrix of the images captured by the camera 122, and applies a transformation matrix of the homography matrix to a shape of the target item in the template image. The processor 203 determines whether the images corresponding to the homography matrix has an area that exceeds a preset second value and is outside a field of view of the camera. When the images corresponding to the homography matrix do not have an area exceeding the preset second value and being outside the field of view of the camera, the processor 203 determines whether a distortion degree of a shape of the images corresponding to the homography matrix is greater than a preset distortion degree. When the distortion degree of the shape of the images corresponding to the homography matrix is not greater than the preset distortion degree, the processor 203 determines the confidence score for the matching degree of the objects according to a preset confidence scoring rules. The confidence scoring rule is positively correlated with the inlier ratio and the perspective angle.

In other words, the processor 203 compares the captured image and the image of the target item to be grasped in the database to determine whether there are too few inlier matches. If not, the homography matrix of the captured image is then calculated, and the transformation matrix of the homography matrix is applied to the shape of the object to be grasped. According, to the homography matrix and the transformation matrix, it can be determined whether most area of the image corresponding to the homography matrix is outside the field of view of the camera. If not, the processor 203 determines whether the shape of the image corresponding to the homography matrix is seriously distorted. If not, the processor 203 calculates the confidence score, which is mainly determined by the inner ratio and the perspective angle. Their respective weights can be set according to actual needs. In one example, the calculation can be performed by the following codes written by C language: float regionScore=1−abs(90−minAngle)/90.0; float inlinerPerc=getInliers.size/(getInliers.size+getOutliers.size); float confScore=1*regionScore*inlierPerc/(regionScore+inlinerPerc), where "float" represents a decimal, "regionScore" represents the degree of distortion of the detected region, each template image is a rectangular image. If it remains rectangular after homography transformation, and each corner is equal to 90 degrees, it means that there is no distortion. In this case, regionScore is equal to 100% if the degree of distortion is large, for example, it becomes a trapezoid, and the smallest of the four corners is equal to 45 degrees, then regionScore=1−(90−45)/90=50%. "minAngle" represents the minimum inner angle of the distorted image, and "inlinerPerc" represents the ratio of inlier points to all of the detected points. For example, there are 100 points in each template image, and homography has 40 corresponding points. Thus, the inlier equal to 40 and the outlier is equal to 60, and inlinerPerc=40%. "confScore" represents the confidence score, which is determined by regionScore and inlinerPerc. The larger the regionScore and inlinerPerc are, the larger the confScore is.

Step S95: Determining a grasping position and a grasping vector of the target item.

When the mobile robot prepares to grasp the target item, it performs vision-manipulation dose-loop optimization. When the hand mourned with the camera approaches the target item, multiple detections are performed through the vision guidance algorithm to detect multiple images on the time axis. The mobile robot's hand is controlled to move to the "promising area" through visual guidance, and further detections are performed in the promising area. Each detection finds the best grasping positions and grasping vector for the promising area, and the hand of the mobile robot is then controlled to approach the target item according to the detection result. After that, another detection is performed and the hand of the mobile robot is then controlled to further approach the target item until the hand has successfully grasped the target item according to the latest grasping positions and grasping vector, which completes the closed-loop optimization of visual manipulation.

In other words, when the manipulator reaches for the target item, a number of images of the target item are captured by the camera. According to the grasping positions and the grasping vector inserted in the template images, a first promising area of each of the images of the target item is determined. After that, the manipulator is controlled to move closer to the first promising area, and a second promising area of the first promising area of each of the images of the target item is determined. The hand of the robot is then controlled to move toward the target item according to a determining result until the manipulator grasps the target item. The determining result here refers to is the detected grasping positions and grasping vector when the distance between the hand and the target item is less than a preset distance.

Step S96; Controlling the manipulator and the hand to grasp the target item according to the grasping position and the grasping vector, and placing the target item to a target position.

In one embodiment, a distance sensor many be mounted on the hand of the mobile robot. The camera of the mobile robot is to capture 2D images, and the depth information of the 2D images are estimated by the Euclidean distance between key feature positions in the 2D images. The shorter distance implies the smaller observations, in hence the farther the target is located relative to the camera. The accuracy of the depth estimation result is within 0.5 cm. When the hand is close to and stops above an object, the distance sensor will help guide the hand of the mobile robot to reach the precise depth level where the surface of the object is located. The distance sensor detects the distance from the hand of the mobile robot to the target item, and guides the hand to reach the surface of the target item according to the distance. The camera and the distance sensor arranged on the hand jointly determine the grasping depth of the target item grasped by the hand.

Figure 12:
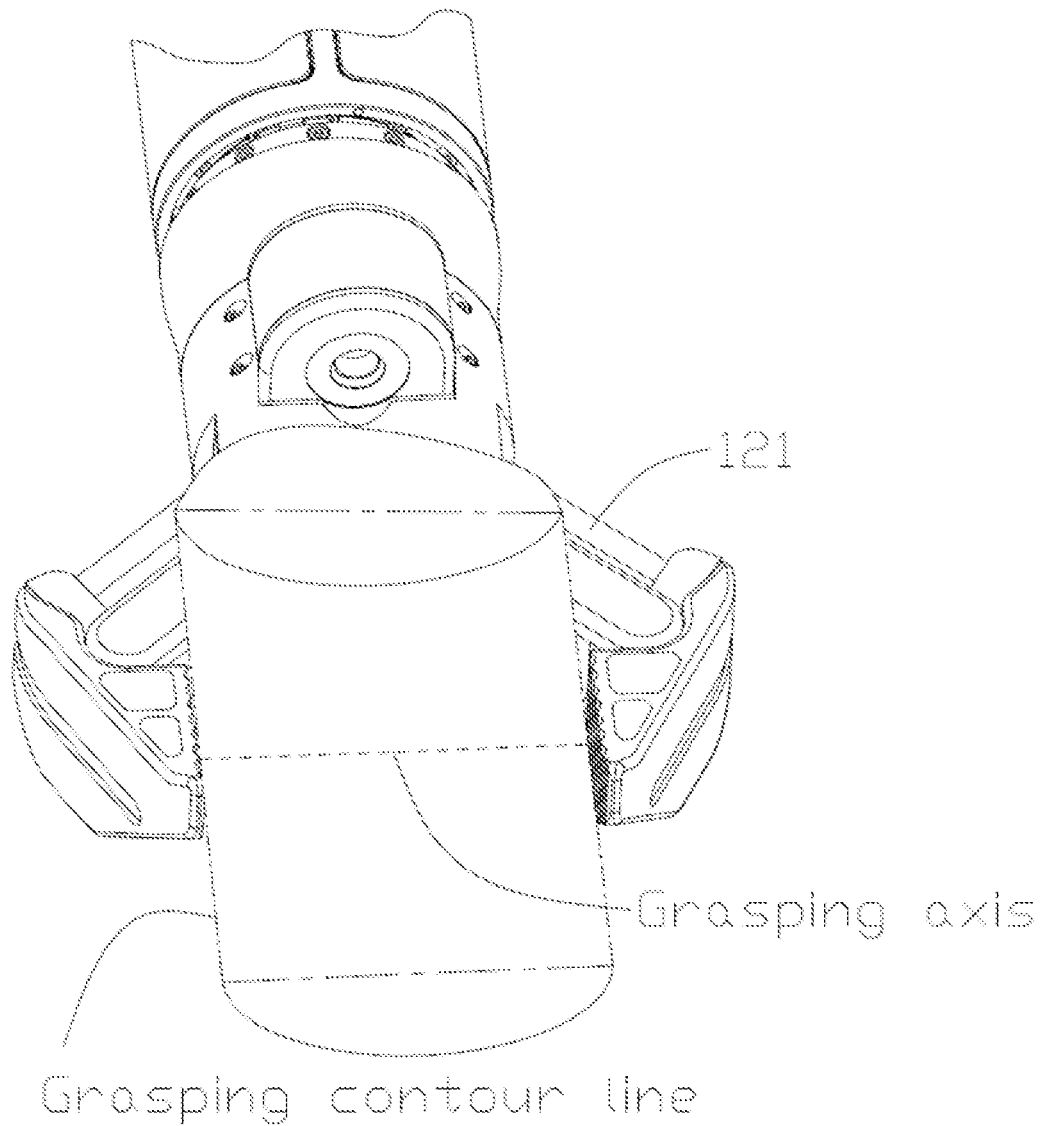
FIG. 12 shows an exemplary application scenario of the hand of the mobile robot grasping a cylindrical target item.

FIG. 12 shows an exemplary detection result of the target item obtained during the visual guided detection. Specifically, the dashed and dotted line in FIG. 12 represents a grabbing contour line around an exemplary target item (i.e., a cylindrical object). The horizontal grasping axis of the target item is to adapt to the gripping balance of the two-finger hand. The intersections of the grasping axis and the gripping contour line are the grasping positions of the two-finger hand.

Step S97: Performing barcode verification to verify whether the desired target item has been grasped.

In one embodiment, a barcode verification module is integrated on the mobile robot to ensure close to 100% accuracy and minimum misrecognition rate. Specifically, the hand is controlled to rotate the target item in the air by 360 degrees after the hand has grasped the target item, and the barcode verification module continuously observes the target item during rotation by a USB camera mounted on a side of the hand If there is a barcode attached on a surface of the target item, the barcode verification module continuously captures images of the barcode by the USB camera, runs a barcode finding and decoding algorithm based on the captured images of the barcode, and produces a barcode string. The barcode verification module compares the produced barcode string with a pre-stored barcode string of the target item in the database. If they are the same, it is determined that the object grasped by the mobile robot is the desired target item to be grasped for this grasping task. The mobile robot is then controlled to place the target item to a determined target position, in one embodiment, only some ambiguous ones or the ones easy to mistake have barcodes on them. If there is no barcode on the target item, the mobile robot may be controlled to directly place the target item to the determined target position without barcode verification. The barcode stored in the database is entered during the item scanning step, together with template capturing and grasp data insertion. Further, if the produced barcode string is different from the pre-stored barcode string of the target item, it is determined that the object grasped by the mobile robot is not the desired target item to he grasped for this grasping task. In this case, the hand may be controlled to place the grasped object in another preset position or put the grasped object back.

Step S98. Placing the target item to a target position in response to the verification having been passed.

After the barcode verification is passed, the mobile robot is controlled to move to a determined position, and release the hand to place the grasped target item to the target position.

By implementing the method in the embodiments above, the mobile robot captures the images of multiple objects using its camera, extracts visual features from the images, matches the extracted visual features to the data of the target item in the database, and determines the target item to be grasped. The mobile robot performs a closed-loop optimization of "looking while approaching" using the mobility of the camera installed on the EOAT. The mobile robot adopts a multiple detection approach. That is, the mobile robot calculates the grasping positions and grasping vector of the target item while approaching the target item, so as to realize the accurate calculation of the grasping action and improve the grasping accuracy. When the target item has been grasped, the barcode is verified to further improve the accuracy of grasping the target item.

By implementing the method in the embodiments above, the mobile robot can provide an end-to-end complete solution for item delivery automation. The system is complete, including from item scanning to delivery verification. In addition, vision and manipulation software can be made to run on a single central processing unit (CPU) board. The automation of the delivery process can help improve above conditions Technically, the mobile robot is self-contained, including item scanning device, bar code verification, and internal lighting design, which needs minimum retrofitting effort to the target logistics facility, making it cost effective.

In one embodiment, a non-transitory computer-readable storage medium is provided. The non-transitory computer-readable storage medium may be configured in the mobile robot 20. The non-transitory computer-readable storage medium stores executable computer programs, and when the programs are executed by the one or more processors of the mobile robot 20, the method for visually guided picking and placing objects described in the embodiments above is implemented.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may he integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device) terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor in which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A computer-implemented vision-guided picking and placing method for a mobile robot that comprises a manipulator having a hand and a camera, the method comprising:
    receiving a command instruction that instructs the mobile robot to grasp a target item among at least one object;
    controlling the mobile robot to move to a determined location associated with the at least one object, controlling the manipulator to reach for the at least one object, and capturing one or more images of the at least one object using the camera in real time;
    extracting visual feature data from the one or more images, matching the extracted visual feature data to preset feature data of the target item in a database to identify the target item, and determining a grasping position and a grasping vector of the target item, wherein the grasping position is determined based on a type of the hand of the manipulator and is higher than a center of gravity of the target item, and the grasping vector comprises a grasping pose; and
    controlling the manipulator and the hand to grasp the target item according to the grasping position and the grasping vector, and placing the target item to a target position;
    wherein. before receiving the command instruction, the method further comprises:
        scanning at least one sample item associated with a pick-and-place task performed by the mobile robot to obtain template images corresponding to each of the at least one sample item, wherein the at least one sample item comprises the target item, and the template images are captured at a plurality of different perspectives around each sample item;
        inserting grasping data of at least one pair of grasping points into each template image, wherein the grasping data comprises a grasping position and a grasping vector associated with the at least one sample item, and the at least one pair of grasping points are positions on each sample item in contact with fingers of the hand such that each sample item can be grasped by the hand; and
        storing the template images and the grasping data corresponding to the template images as feature data of a corresponding one of the at least one sample item;
    wherein extracting visual feature data from the one or more images and matching the extracted visual feature data to preset feature data of the target item in the database to identify the target item comprises:
        extracting a plurality of the visual feature data from each frame of the one or more images using an oriented fast and rotated brief (ORB) algorithm; and
        matching the plurality of the visual feature data to the visual feature data of the target item using a balanced binary search method and a nearest Euclidean distance algorithm to identify the target item, wherein the visual feature data of the target item is extracted from a template image of the target item by using the ORB algorithm; and
    wherein determining the grasping position and the grasping vector of the target item comprises:
        when the manipulator is reaching for the target item, capturing a plurality of images of the target item using the camera:
        according to the grasping position and the grasping vector inserted in the template images, determining a first promising area of each of the plurality of the images of the target item;
        controlling the manipulator to move closer to the first promising area, and determining a second promising area of the first promising area of each of the plurality of the images of the target item by performing a plurality of detections in the first promising area, wherein each detection finds best grasping positions and best grasping vector for the first promising area, and the hand is controlled to approach the target item according to the best grasping positions and best grasping vector after each detection; and
        controlling the hand to move toward the target item according to a determining result until the manipulator grasps the target item, wherein the determining result refers to detected grasping positions and grasping vector when a distance between the hand and the target item is less than a preset distance.

2. The method of claim 1, wherein controlling the mobile robot to move to the determined location associated with the at least one object and controlling the manipulator to reach for the at least one object comprises:
    in response to detection of the target item, calculating collision-free motion trajectories of the manipulator according to a position and an orientation of the target item,
    in response to existence of two or more collision-free motion trajectories, selecting one of the collision-free motion trajectories as a final motion trajectory, wherein the final trajectory is picked based on constraints stochastically;
    in response to existence of one collision-free motion trajectory, selecting the collision-free motion trajectory as a final motion trajectory; and
    controlling the manipulator to move toward the target item according to the final motion trajectory, wherein when there are two or more collision-free motion trajectories, the final trajectory is executed by low-level manipulator motion control, the manipulator moves to an object detection and recognition site, opens an end of arm tooling (EOAT) of the manipulator, waits for a position or orientation command calculated by a vision module, and approaches the target item with EOAT half-open and does a grasp, and wherein the low-level manipulator motion control refers to a position control and a speed control.

3. The method of claim 2, further comprising:
    obtaining a 2D image of the target item using the camera, and determining depth information of the 2D image according to Euclidean distances between key feature positions in the 2D image; and
    when the hand is close to the target item and stops above the target item, determining distance information of the target item using a distance sensor, and guiding the hand to grasp the target item according to the distance information and the depth information, wherein when the hand is close to the target item and stops above the target item, a distance from the hand to the target item is detected by the distance sensor, and the hand is guided to reach a surface of the target item according to the detected distance, and wherein the camera and the distance sensor arranged on the hand jointly determine a grasping depth of the target item.

4. The method of claim 1, further comprising, before placing the target item to the target position,
controlling the hand to rotate the target item by 360 degrees after the hand has grasped the target item, and continuously observing the target item during rotation by a camera mounted on a side of the hand;
in response to detection of a barcode attached on a surface of the target item, continuously capturing, by the camera mounted on the side of the hand, images of the barcode;
running a barcode finding and decoding algorithm based on the images of the barcode, and producing a barcode string;
comparing the barcode string with a pre-stored barcode string of the target item in the database;
in response to the barcode string and the pre-stored barcode string being the same, controlling the mobile robot to place the target item to the target position:
in response to the barcode string being different from the pre-stored barcode string, controlling the mobile robot to place the target item in a preset position or put the target item back; and
in response to there being no barcode attached on the target item, controlling the mobile robot to place the target item to the target position.

5. A mobile robot comprising:
a manipulator having a hand and a camera;
one or more processors;
a memory; and
one or more programs, wherein the one or more programs are stored in the memory and configured to be executed by the one or more processors, the one or more programs comprise:
instructions for receiving a command instruction that instructs the mobile robot to grasp a target item among at least one object;
instructions for controlling the mobile robot to move to a determined location associated with the at least one object, controlling the manipulator to reach for the at least one object, and capturing one or more images of the at least one object using the camera in real time;
instructions for extracting visual feature data from the one or more images, matching the extracted visual feature data to preset feature data of the target item in a database to identify the target item, and determining a grasping position and a grasping vector of the target item, wherein the grasping position is determined based on a type of the hand of manipulator and is higher than a center of gravity of the target item, and the grasping vector comprises a grasping pose; and
instructions for controlling the manipulator and the hand to grasp the target item according to the grasping position and the grasping vector, and placing the target item to a target position;
wherein, the one or more programs further comprise, before receiving the command instruction,
instructions for scanning at least one sample item associated with a pick-and-place task performed by the mobile robot to obtain template images corresponding to each of the at least one sample item. wherein the at least one sample item comprises the target item, and the template images are captured at a plurality of different perspectives around each sample item;
instructions for inserting grasping data of at least one pair of grasping points into each template image, wherein the grasping data comprises a grasping position and a grasping vector associated with the at least one sample item, and the at least one pair of grasping points are positions on each sample item in contact with fingers of the hand such that each sample item can be grasped by the hand; and
instructions for storing the template images and the grasping data corresponding to the template images as feature data of a corresponding one of the at least one sample item;
wherein the instructions for extracting visual feature data from the one or more images and matching the extracted visual feature data to preset feature data of the target item in the database to identify the target item comprise:
instructions for extracting a plurality of the visual feature data from each frame of the one or more images using an oriented fast and rotated brief (ORB) algorithm; and
instructions for matching the plurality of the visual feature data to the visual feature data of the target item using a balanced binary search method and a nearest Euclidean distance algorithm to identify the target item, wherein the visual feature data of the target item is extracted from a template image of the target item by using the ORB algorithm; and
wherein determining the grasping position and the grasping vector of the target item comprises:
when the manipulator is reaching for the target item, capturing a plurality of images of the target item using the camera:
according to the grasping position and the grasping vector inserted in the template images. determining a first promising area of each of the plurality of the images of the target item;
controlling the manipulator to move closer to the first promising area, and determining a second promising area of the first promising area of each of the plurality of the images of the target item by performing a plurality of detections in the first promising area, wherein each detection finds best grasping positions and best grasping vector for the first promising area, and the hand is controlled to approach the target item according to the best grasping positions and best grasping vector after each detection; and
controlling the hand to move toward the target item according to a determining result until the manipulator grasps the target item, wherein the determining result refers to detected grasping positions and grasping vector when a distance between the hand and the target item is less than a preset distance.

6. The mobile robot of claim 5, wherein the instructions for extracting visual feature data from the one or more images and matching the extracted visual feature data to preset feature data of the target item in the database to identify the target item comprise:

instructions for extracting a plurality of the visual feature data from each frame of the one or more images using an oriented fast and rotated brief (ORB) algorithm;

instructions for comparing the plurality of the visual feature data with the visual feature data of the target item to obtain an inlier ratio and a perspective angle, wherein the visual feature data of the target item is extracted from a template image of the target item by using the ORB algorithm;

instructions for determining a confidence score for a matching degree of the at least one object according to the inlier ratio and the perspective angle; and instructions for determining one of the at least one object with highest confidence score as the target item.

7. The mobile robot of claim 6, wherein the instructions for determining the confidence score for the matching degree of the at least one object according to the inlier ratio and the perspective angle comprise:

instructions for determining whether the inlier ratio is less than a first preset value;

instructions for, in response to the inlier ratio being not less than the first preset value, calculating a homography matrix of the one or more images, and applying a transformation matrix of the homography matrix to a shape of the target object in the template image;

instructions for determining whether the one or more images corresponding to the homography matrix has an area exceeding a preset second value and being outside a field of view of the camera;

instructions for, in response to the one or more images corresponding to the homography matrix not having an area exceeding the preset second value and being outside the field of view of the camera, determining whether a distortion degree of a shape of the one or more images corresponding to the homography matrix is greater than a preset distortion degree;

instructions for, in response to the distortion degree of the shape of the one or more images corresponding to the homography matrix being not greater than the preset distortion degree, determining the confidence score for the matching degree of the at least one object according to a preset confidence scoring rule, wherein the confidence scoring rule is positively correlated with the inlier ratio and the perspective angle.

8. The mobile robot of claim 5, wherein the instructions for controlling the mobile robot to move to the determined location associated with the at least one object and controlling the manipulator to reach for the at least one object comprise:

instructions for, in response to detection of the target item, calculating collision-free motion trajectories of the manipulator according to a position and an orientation of the target item, instructions for, in response to existence of two or more collision-free motion trajectories, selecting one of the collision-free motion trajectories as a final motion trajectory;

instructions for, in response to existence of one collision-free motion trajectory, selecting the collision-free motion trajectory as a final motion trajectory;

instructions for controlling the manipulator to move toward the target item according to the final motion trajectory.

9. The mobile robot of claim 8, further comprising:

instructions for obtaining a 2D image of the target item using the camera, and determining depth information of the 2D image according to Euclidean distances between key feature positions in the 2D image; and instructions for, when the hand is close to the target item and stops above the target item, determining distance information of the target item using a distance sensor, and guiding the hand to grasp the target item according to the distance information and the depth information.

10. The mobile robot of claim 5, further comprising, before placing the target item to the target position, instructions for controlling the hand to rotate the target item by 360 degrees after the hand has grasped the target item, and continuously observing the target item during rotation by a camera mounted on a side of the hand;

instructions for, in response to detection of a barcode attached on a surface of the target item, continuously capturing, by the camera mounted on the side of the hand, images of the barcode;

instructions for running a barcode finding and decoding algorithm based on the images of the barcode, and producing a barcode string;

instructions for comparing the barcode string with a pre-stored barcode string of the target item in the database;

in response to the barcode string and the pre-stored barcode string being the same, controlling the mobile robot to place the target item to the target position.

11. The mobile robot of claim 5, wherein the manipulator is foldable, the manipulator comprises: a link body comprising multiple links connected to one another, an end of arm tooling (EOAT) and a mounting interface, the EOAT comprises the hand and the camera, the hand is a two-finger gripper, and the camera is mounted on the hand;

wherein the visual feature data comprises color features, texture features, shape features and spatial relationship features, and extraction positions of the visual feature data comprise edges, corners, regions and ridges; and wherein the grasping pose comprises a grasping orientation, or a yaw angle of the target item, or a grasping angle of the target item being grasped and picked up.

12. A non-transitory computer-readable storage medium storing one or more programs to be executed by one or more processors of a mobile robot, the one or more programs, when being executed by one or more processors, causing the mobile robot to perform processing comprising:

receiving a command instruction that instructs the mobile robot to grasp a target item among at least one object;

controlling the mobile robot to move to a determined location associated with the at least one object, controlling the manipulator to reach for the at least one object, and capturing one or more images of the at least one object using the camera in real time;

extracting visual feature data from the one or more images, matching the extracted visual feature data to preset feature data of the target item in a database to identify the target item, and determining a grasping position and a grasping vector of the target item, wherein the grasping position is determined based on a type of the hand of manipulator and is higher than a center of gravity of the target item, and the grasping vector comprises a grasping pose; and controlling the manipulator and the hand to grasp the target item according to the grasping position and the grasping vector, and placing the target item to a target position;

wherein. before receiving the command instruction, the processing further comprises:

scanning at least one sample item associated with a pick-and-place task performed by the mobile robot to obtain template images corresponding to each of the at least one sample item, wherein the at least one sample item comprises the target item, and the template images are captured at a plurality of different perspectives around each sample item;

inserting grasping data of at least one pair of grasping points into each template image, wherein the grasping data comprises a grasping position and a grasping vector associated with the at least one sample item, and the at least one pair of grasping points are positions on each sample item in contact with fingers of the hand such that each sample item can be grasped by the hand; and storing the template images and the grasping data corresponding to the template images as feature data of a corresponding one of the at least one sample item;

wherein extracting visual feature data from the one or more images and matching the extracted visual feature data to preset feature data of the target item in the database to identify the target item comprises:

extracting a plurality of the visual feature data from each frame of the one or more images using an oriented fast and rotated brief (ORB) algorithm; and matching the plurality of the visual feature data to the visual feature data of the target item using a balanced binary search method and a nearest Euclidean distance algorithm to identify the target item, wherein the visual feature data of the target item is extracted from a template image of the target item by using the ORB algorithm; and wherein determining the grasping position and the grasping vector of the target item comprises:

when the manipulator is reaching for the target item, capturing a plurality of images of the target item using the camera;

according to the grasping position and the grasping vector inserted in the template images. determining a first promising area of each of the plurality of the images of the target item;

controlling the manipulator to move closer to the first promising area, and determining a second promising area of the first promising area of each of the plurality of the images of the target item by performing a plurality of detections in the first promising area, wherein each detection finds best grasping positions and best grasping vector for the first promising area, and the hand is controlled to approach the target item according to the best grasping positions and best grasping vector after each detection; and controlling the hand to move toward the target item according to a determining result until the manipulator grasps the target item, wherein the determining result refers to detected grasping positions and grasping vector when a distance between the hand and the target item is less than a preset distance.

* * * * *